Jan. 10, 1967  C. M. POMEROY ET AL  3,297,487
FUEL CELL
Filed Oct. 16, 1964
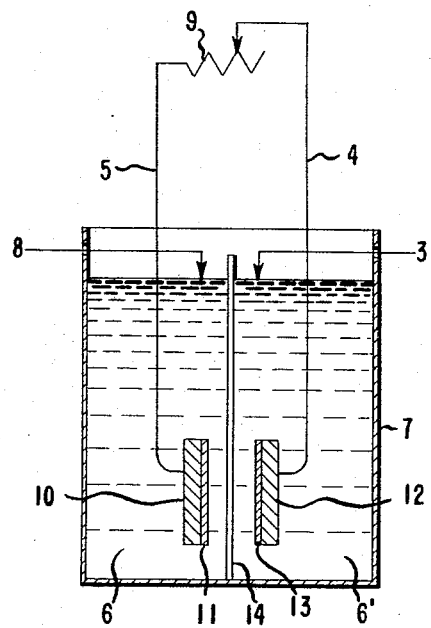
INVENTORS
CHESTER M. POMEROY
JOHN W. WAY
BY *Herbert M. Wolfson*
ATTORNEY 3,297,487
FUEL CELL
Chester M. Pomeroy, Wilmington, Del., and John W. Way, West Chester, Pa., assignors to E. I. du Pont de Nemours and Company, Wilmington, Del., a corporation of Delaware
Filed Oct. 16, 1964, Ser. No. 404,435
9 Claims. (Cl. 136—86)

The present invention relates to fuel cells, that is, electrochemical cells wherein the energy of oxidation of fuels is directly converted to electrical energy.

This application is a continuation-in-part of our copending application Serial No. 324,792, now abandoned, filed November 19, 1963.

Fuel cells generally comprise two electrodes, one an anode and the other a cathode. An oxidizing agent is supplied at the cathode and a fuel at the anode. Oxygen is generally the oxidizing agent and fuels are materials such as hydrogen, methanol, formaldehyde, and other carbon-containing materials. An electrolyte separates the two electrodes and oxidation of the fuel can occur only by virtue of ionic transport across the electrolyte. Alkaline electrolytes have been used in the past because of higher electrode potentials obtainable in the cells of the prior art in such systems. The use of acidic electrolytes is desirable, however, because when carbon-containing materials are used as fuels, carbon dioxide formed by the cell reactions will not be chemically retained, as would be the case with alkaline electrolytes. No fuel cells based on acidic, carbon dioxide-rejecting electrolytes have been developed to date.

In its broader sense, the present invention provides a fuel cell for use with acidic electrolytes in which at least one of the electrodes consists essentially of a metal/silicon combination which includes a metal/silicon alloy and a metal silicide. Metal/silicon combinations have the desirable properties of being conductive yet resistant to corrosion to acidic electrolytes, for example, mineral acids such as sulfuric acid. The characterizing features of the metal/silicon combinations and various preferred embodiments of the invention are set out in detail below.

An embodiment of the invention is represented in schematic form in the drawing. Having reference to the drawing, an anode 10 and a cathode 12 are immersed in an electrolyte represented by 6 and 6′ held in a container 7. When membrane 14 is used, the electrolyte 6 is different from electrolyte 6′. Under these circumstances, electrolyte 6′ is usually nitric acid and serves also as the oxidant. Oxidant may be supplied at 3 to the cathode 12 and fuel may be supplied at 8 to the anode 10. Electrical connection to the anode is made through lead 5 and to the cathode through lead 4 which leads are connected also to a variable electrical resistance 9. The ion-permeable membrane 14 may optionally be provided to prevent substantial contact of oxidant and fuel. A platinum coating on the anode 10 is shown at 11 and a similar coating on the cathode 12 is shown at 13. A current of electrons flows through the external circuit from the anode to the cathode.

Membrane 14 may be omitted when the anode or cathode is used as the fuel or oxidant, respectively. Thus, a lead anode can function as the fuel and a lead dioxide cathode can function as the oxidant. In such cases where the membrane 14 is omitted, the same electrolyte is used at 6 and 6′.

Metal/silicon combinations usable in the electrodes for the fuel cells of this invention are those made from silicon and one or more of the metals selected from the group consisting of iron, cobalt, molybdenum, chromium, manganese, vanadium, tungsten and nickel.

The composition of the metal/silicon combination can contain from about 8% silicon to about 75% silicon, and balance being from one or more of the said metals. If the quantity of silicon falls below this range, the corrosion resistance of the electrode suffers; and if it goes above this range, the sintered metal electrode becomes too friable.

The preferred electrode of the metal/silicon combination is a metal/silicon alloy electrode in the form of a plate, disc or the like with the surface adjacent to the electrolyte having a high surface area. The maximum current density is obtained when the surface area of the electrode is high. The increased surface area of an electrode can be defined by a surface roughness factor which is a ratio of true surface area to the geometric surface area. For the purposes of the present invention, it is preferred that the roughness factor be at least about 2. A roughness factor of about 2 to about 3 or more can be obtained by sand blasting, abrading or etching a solid plate or disc. The plates and discs can be prepared by casting at temperatures above the melting temperature of the alloy. By preparing a porous structure by, for example, sintering the alloy powder, a roughness factor of about 10 or higher can be obtained.

As stated previously, the porous electrode structures can be made by sintering a powder of the metal/silicon combination at the proper temperature in a container of the shape desired for the electrode. The size of the particles should range from about 15 microns to about 115 microns. If the particles are too fine, the electrode does not have the optimum surface area; and if they are too coarse, the electrical conductivity suffers. The optimum temperature for sintering the metal/silicon combination depends on the identity of the metal component of the combination. For example, with ferrosilicon the sintering temperature can range from about 1000° C. to about 1175° C.; with cobalt silicon alloys, from 1150° C. to 1250° C.; and with molybdenum silicon alloys, from 1100° C. to 1650° C. In general, the range of sintering temperatures will be from 1000° C. to 1700° C.

The electrode used as the anode in a fuel cell of the invention has a platinum coating on at least a portion of the surface of the anode which would otherwise be in contact with the acidic electrolyte. The platinum coating can cover the entire anode surface, if desired, but it is sufficient for the purposes of this invention to have it cover a part, and preferably all, of that portion of the anode which would otherwise be in contact with the acidic electrolyte during operation of the fuel cell.

The electrodes used as cathodes in the fuel cells of the invention also preferably are provided with a platinum coating on at least a portion of the surface of the cathode which would otherwise be in contact with the acidic electrolyte. If the fuel cell is to be operated at a temperature below about 65° C., then the cathode should have such a platinum coating but it is not necessary to the proper functioning of the fuel cell that the cathode have a platinum coating if the fuel cell is to be operated at a temperature higher than about 65° C.

The coating of platinum metal can be put on the electrode in several ways. For example, platinum black can be coated on the electrode by immersing it in a solution of chloroplatinic acid and electrolyzing the solution using the electrode as the cathode.

Another way of putting a platinum metal coating on the electrode is to paint a dispersion of a platinum metal resinate on the electrode and then decompose the resinate by heat. Platinum metal resinate is available commercially as the reaction product of the chloride and a sulfurized terpene. U.S. Patent 2,490,399 describes the preparation of gold resinate by reacting gold chloride with pinene mercaptan and the platinum metal resinate can be made in the same manner. Commercially the platinum resinates are available as solutions or pastes.

According to still another way, a dispersion of platinum oxide, $PtO_2$, with a carbon catalyst support such as acetylene black, and a binder such as chlorinated butyl rubber in a solvent for the binder such as dioxane, can be painted on the electrode and allowed to dry. In addition, platinum can be deposited on the electrode by heating the silicide on a steam bath while immersed in an aqueous solution of 0.3 molar concentration or greater of $Na_2PtCl_6$.

Alternatively, the carbon support can be mixed with the proper amount of chloroplatinic acid to give the desired platinum content and the mixture reduced by treating it with hydrogen under atmospheric pressure or higher at about 20° C. to about 100° C. or by mixing it in the presence of alkali with the quantity of formaldehyde or hydrazine necessary to reduce the chloroplatinic acid to platinum metal.

Combinations of the above techniques can also be used. For example, after painting a sluurry of $PtO_2$, binder, carbon black mixture on the electrode, a further coating of platinum black can be applied by electrolysis.

A binder, if used in the coating composition, serves the purpose of holding the catalytic metal on the surface of the electrode but the binder does not enter into the reaction. Accordingly most polymeric materials can be used, for example, chlorinated butyl rubber, polystyrene, polymethyl methacrylate, polyethylene terephthalate, polyvinyl chloride, polyvinyl fluoride, Viton, fluorocarbon elastomer, polyurethanes, polybutadiene, polyisoprene, chlorosulfonated polyethylene, chlorinated polyethylenes, and the like.

The solvent used for dissolving the binder is not critical. Illustrative of suitable solvents for the binders are dioxane, methanol, formic acid, ethanol, ethyl acetate, butyl acetate, dioxolane, ether, cyclohexanone, acetic acid and the like.

Carbon black used in the coating composition should be as conductive as possible in order to minimize the internal resistance of the fuel cell. The electrical resistivity of commercially available acetylene black ranges from about 0.001 ohm/inch to about 0.030 ohm/inch and such products are suitable as are more conductive acetylene blacks.

The preferred acidic electrolyte used in the fuel cells of the invention is aqueous sulfuric acid having a concentration between about 20% to about 40% by weight because such mixtures have a low electrical resistance. Other concentrations of aqueous sulfuric acid are usable, however, as are aqueous solutions of other acids such as phosphoric acid, ammonium sulfate, ammonium bisulfate and the like.

The cation-permeable membranes useful in some embodiments of the invention for shielding the fuel from the oxidant are well known in the art. The preparation and properties of a number of different types of cation-exchange resins suitable for forming membranes are described; for example, in "Ion Exchange Technology," Nachod and Schubert, Academic Press, 1956; "Ion Exchange Resins," Kunin and Myers, John Wiley, 1950; Kirk-Othmer, "Encyclopedia of Chemical Technology," vol. 8, pp. 1–17, Interscience, 1952; and Osborn, "Synthetic Ion Exchangers," Macmillan Co., 1956.

The formation of these cation exchange resins into membranes is well known in the art. In general, these membranes are of two types, thos in which granules of resin are imbedded in a matrix of a binder such as polyethylene or polyvinyl chloride, and the continuous type in which the entire membrane is composed of the cation exchange resin. Preparation of cation-permeable membranes is described, for example, in "Amberplex Ion Permeable Membranes," Rohm and Haas Co., Phila. (1952), and in references mentioned in that publication. The preparation of other ion exchange membranes is described in U.S. Patents 2,636,851 (Juda et al.) and 2,702,272 (Kasper).

The cation-permeable membranes can also be composed of inorganic cation exchange materials such as silica, the zeolites and others. Colloidal silica prepared as in U.S. Patents 2,574,902 (Bechtold et al.), and 2,577,485 (Rule) is satisfactory, for example. Such cation-permeable membranes can be built up on a mesh support such as a stainless steel screen by dipping the screen into the colloidal silica dispersion in water and drying. Membranes of the desired thickness can be built up by repeated dipping and drying treatments. The membrane also can be built directly onto the porous silicide electrode by exposing the desired part of the electrode to the silica dispersion and drying. Inorganic cation-permeable membranes are preferred for use at temperatures above about 65° C.

The thickness of the membranes employed is not critical and can vary from a few mils up to a quarter of an inch or more. However, the membranes are as thin as possible, while still preventing contact of the fuel with the oxidant, in order to minimize the internal resistance of the cell.

The ion permeable membrane can be located at any position between the anode and cathode, the only requirement being that the membrane be located so as to prevent substantial contact of fuel and oxidant.

In operation, hydrogen ions are generated at the anode and are transferred through the electrolyte to the cathode passing through the cation-permeable membrane before reaching the cathode. When the oxidizing agent is nitric acid, for example, the membrane substantially prevents migration of nitrate ions from the oxidizing agent to the anode, as well as preventing migration of fuel from the anode to the cathode.

The temperature of operation of the fuel cell can range from about 0° C. to about 150° C. In general, more current can be drawn from a fuel cell at a constant potential when the temperature is increased. However, at temperatures above about 150° C. the corrosive action of the acidic electrolyte on metals in the fuel cell is greatly accelerated.

Water generated by the electrochemical reactions must be removed to avoid undue dilution. This can be conveniently done at a temperature above 100° C. by having the entire cell attached to a condenser which selectively removes the proper amount of water.

It is not essentiall to the practice of the invention that both electrodes be made of the metal-silicon combination. Thus, as mentioned previously, the cathode can be replaced by a combination cathode and solid oxidizer such as a lead dioxide plate of the kind used in a storage battery, the anode remaining as shown. Alternatively, the anode can be replaced with a combination anode and solid fuel such as a lead plate of the kind used in a storage battery, the cathode remaining as shown.

The invention will be more clearly understood by referring to the examples which follow. These examples should not be considered to limit the invention in any way. Parts and percentages in the examples are by weight, unless otherwise stated.

*Example 1*

A porous ferrosilicon disc with a diameter of 1.51 cm. is prepared by sintering ferrosilicon powder, containing 45% silicon and passing a 325 mesh screen, loosely packed in a graphite mold for 45 minutes in a vacuum at 1100° C. The porous disc obtained is coated with a thin coating of platinum resinate (Hanovia No. 6082, 12% platinum content) sufficient to give a 5–10 mg./cm.$^2$ and allowed to air dry. The resinate is then decomposed by exposure to a heat gun to give an adherent coating of gray platinum. The fuel cell of the drawing with the membrane omitted is operated at room temperature using the disc as the cathode, 92% aqueous nitric acid as the oxidant, 30% sulfuric acid as the electrolyte and a lead plate from a dry-charged lead storage battery as the fuel and anode with the following results.

| Current density, milliamperes/cm.$^2$: | Cathode potential vs. saturated calomel electrode (volts) |
|---|---|
| 0 | 1.20 |
| 40.2 | 0.974 |
| 102 | 0.872 |
| 195 | 0.753 |
| 300 | 0.730 |
| 470 | 0.634 |
| 559 | 0.608 |

The disc shows no indication of being chemically attacked by the electrolyte after several hours exposure.

By comparison a disc similarly prepared, except that the platinum coating is omitted, gives under identical conditions an open-circuit voltage of 1.08 and only 0.48 volt at 223 milliamperes/cm.$^2$.

*Example 2*

Ferrosilicon powder containing 45% silicon, is placed in a 5/8″ diameter by 1/8″ deep graphite mold. The filled mold is sintered at 1100° C. for 45 minutes. The resulting electrode is coated with gray platinum in the manner described in Example 1. This electrode is operated in the fuel cell described in Example 1, using oxygen as the oxidant, 30% sulfuric acid as the electrolyte and a porous lead plate from a lead storage battery as the anode and fuel. The oxygen flow rate is adjusted so that the open circuit potential of the cathode with respect to a saturated calomel electrode is a maximum. When current is drawn from the cell the following results are obtained.

| Current density, milliamperes/cm.$^2$: | Potential (volt) vs. saturated calomel electrode |
|---|---|
| 0 | 0.735 |
| 17.2 | 0.735 |
| 59.3 | 0.119 |

*Example 3*

A ferrosilicon disc is prepared and coated with gray platinum as described in Example 1. This disc is operated as an anode in the fuel cell described in Example 1 using 98% formic acid as the fuel, 30% sulfuric acid as the electrolyte and a porous lead dioxide plate from a lead storage cell as the cathode and oxidizer.

The following results are obtained:

| Current density, milliamperes/cm.$^2$: | Anode potential (volts) vs. saturated calomel electrode |
|---|---|
| 0 | 0.04 |
| 56 | 0.656 |
| 102 | 0.721 |
| 226 | 0.754 |

Similar results are obtained when a disc of a cobalt/silicon alloy is substituted for the ferrosilicon disc in the above example.

*Example 4*

Example 3 is repeated with the exception that methanol is used as the fuel at room temperature instead of 98% formic acid. The following results are obtained:

| Current density, milliamperes/cm.$^2$: | Anode potential (volts) vs. saturated calomel electrode |
|---|---|
| 0 | 0.14 |
| 45 | 0.536 |
| 192 | 0.804 |
| 268 | 1.09 |

*Example 5*

A 2 cm.$^2$ ferrosilicon disc, prepared from ferrosilicon powder as described in Example 1, is coated with a slurry of platinum dioxide, acetylene black, and chlorinated rubber in dioxane and dried. The electrode is then platinized with platinum black from a 3% $H_2PtCl_6$ solution at 0.475 ampere for 3 minutes. This electrode is then placed in the fuel cell describebd in Example 1. Using methanol as the fuel at 90° C., 30% sulfuric acid as the electrolyte and a porous lead dioxide plate from a storage cell as the cathode and oxidizer, the cell gives the results below. The potential of the anode is measured with reference to an Ag/AgCl reference electrode ($E° = +0.18$ volt) but for comparative purposes this potential has been corrected to compare with a saturated calomel electrode.

| Current density, milliamperes/cm.$^2$: | Anode potential (volts) vs. saturated calomel electrode |
|---|---|
| 0 | 0.16 |
| 178 | 0.42 |
| 360 | 0.44 |
| 500 | 0.45 |
| 600 | 0.48 |

Similar results are obtained when a disc of a nickel/silicon alloy is substituted for the ferrosilicon disc in the above example.

*Example 6*

A ferrosilicon disc is prepared as described in Example 5 and used in the fuel cell described in Example 1 at 25° C. using methanol as the fuel, 30% aqueous $H_2SO_4$ as the electrolyte and a porous platinum disc in contact with 70% nitric acid as the cathode. The anode potential is again measured versus a saturated calomel electrode.

| Current density, milliamperes/cm.$^2$: | Anode potential (volts) vs. saturated calomel electrode |
|---|---|
| 0 | 0.36 |
| 29 | 0.50 |
| 87 | 0.54 |
| 101 | 0.56 |
| 130 | 0.57 |

*Example 7*

The procedure described in Example 5 is repeated using trioxane as the fuel with the following results:

| Current density milliamperes/cm.$^2$: | Anode potential (volts) vs. saturated calomel electrode |
|---|---|
| 0 | 0.18 |
| 60 | 0.325 |
| 81 | 0.35 |
| 157 | 0.37 |
| 209 | 0.40 |

Similar results are obtained when a disc of a manganese/silicon alloy is substituted for the ferrosilicon disc.

*Example 8*

A porous molybdenum disilicide disc is prepared by vacuum sintering the loosely packed powder of said compound in a cylindrical graphite mold (5/8″ diam. x 1/8″) at 1250° C. for 2 hours. The disc is coated with 20% Pt on Shawinigan carbon black/chlorinated butyl rubber catalyst paint and then platinized for 5 minutes at 0.50 ampere. The glass electrode holder is filled with methanol and operating at 90° C. with 30 weight percent $H_2SO_4$ as the electrolyte and a $PbO_2$ cathode the following performance is observed.

| Current density, milliamperes/cm.$^2$: | $E_{CH_3OH}$ vs. saturated calomel electrode |
|---|---|
| 50 | .33 |
| 87 | .355 |
| 120 | .38 |
| 207 | .42 |
| 270 | .435 |
| 300 | .45 |
| 360 | .465 |

By a comparison a disc similarly prepared, except that the coating and Pt black is omitted gives under identical conditions 5 ma./cm.$^2$ at 1.0 v. vs. s.c.e.

Similar results are obtained when a disc of a vanadium/silicon alloy is substituted for the ferrosilicon disc.

*Example 9*

A fuel cell is constructed using catalyzed porous ferrosilicon electrodes prepared in a manner similar to that described in Example 5. In this cell both electrodes were Pt catalyzed with platinum deposited by a displacement reaction from $Na_2PtCl_6$. Oxygen is used as the oxidant and methanol as the fuel (12.5 volume percent $CH_3OH$ in 30 weight percent $H_2SO_4$). The cell exhibits an open-circuit voltage of 0.765 volt and delivers 12.5 ma./cm.$^2$ at 0.375 volt. No deterioration of the electrochemical behavior is observed after 6 hours.

*Example 10*

A fuel cell is constructed using platinum catalyzed ferrosilicon electrodes constructed in the following manner. Ferrosilicon powder (17% Si) which passes through a 140 mesh ASTM screen but not through a 270 mesh ASTM screen is loosely packed in a graphite mold and then sintered at 1050° C. for 2 hours in a resistance heated vacuum furnace to form a coherent porous body to serve as an electrode. Electrical leads are welded to two such electrodes.

The electrodes are placed in individual glass containers and covered with 25 ml. of aqueous sodium chloroplatinate solution (ca. 0.3 M Pt) and heated in a steam bath until the solution becomes colorless. Electrode A gains 1.267 g. whereas electrode B gains 1.650 g. This is equivalent to 32 milligram of Pt/cm.$^2$ for electrode A and 41 milligrams of Pt/cm.$^2$ for electrode B.

The electrodes are assembled into a fuel cell like that in the drawing. A sulfonic acid type, heterogenous cation exchange membrane is used as the separator. Electrode A serves as the cathode and 70% $HNO_3$ is used as the oxidant whereas electrode B serves as the anode and 12.5 volume percent $CH_3OH$ (in 30 weight percent $H_2SO_4$) is used as the fuel. The electrolyte is 30% sulfuric acid. The cell has an open-circuit voltage of 0.92 volt and delivered 50 ma./cm.$^2$ at 0.3 volt for 40 hours without deterioration.

*Example 11*

A fuel cell is constructed using platinized porous ferrosilicon electrodes in the following manner. The anode is prepared by heating a 0.5 M $Na_2PtCl_6$ solution containing a porous ferrosilicon (17% Si) disc on a steam bath until Pt is deposited by a displacement reaction. The cathode is prepared by coating another porous ferrosilicon disc with Pt resinate solution and decomposing the resinate by heat. The cell is assembled as in the drawing. A cation permeable membrane of the sulfonic acid type is used to separate the anode and cathode compartment. The electrolyte is 30% sulfuric acid. Using 70% $HNO_3$ as the oxidant and methanol as the fuel (12.5 volume percent $CH_3OH$ in 30 weight percent $H_2SO_4$) the cell has an open-circuit voltage of 0.80 volt and delivers 50 ma./cm.$^2$ at 0.3 volt. The cell has been operated for 150 hours with no deterioration.

*Example 12*

A porous cathode is made by sintering a 45% Si-55% Fe ferrosilicon alloy powder in a carbon mold at 1100° C. for 45 minutes in a vacuum furnace. The particle size distribution of the powder is 44.7% held on 270 mesh screen, 12.1% through a 270 mesh screen but held on a 325 mesh screen, 5.8% through a 325 mesh screen but held on a 400 mesh screen, and 37.4% through a 400 mesh screen. The electrode has an area of 1.79 square centimeters and is 1/8" thick.

An ion-permeable membrane is prepared by repeatedly dipping, with air drying between dips, a 400 mesh stainless steel screen, into an aqueous sol of colloidal silica until nitric acid will not flow through the screen. The sol of colloidal silica is prepared as described in U.S. Patent No. 2,577,485.

The membrane is cut to the same shape as the cathode and is mounted about 1/8 inch away from the cathode and the edge is sealed to prevent the influx of electrolyte or the outflow of nitric acid. The cathode is then placed in the cell of the drawing as 12. A lead plate from a storage battery is used as the anode and fuel, 70% aqueous nitric acid as the oxidizer is added at 3 to be the electrolyte 6'. The electrolyte 6 is 30% sulfuric acid. At room temperature the following results are obtained.

| Current density, milliamperes/cm.$^2$: | Cathode potential vs. saturated calomel electrode |
|---|---|
| 0 | 0.98 |
| 54 | 0.89 |
| 272 | 0.82 |
| 380 | 0.81 |
| 435 | 0.80 |
| 543 | 0.77 |

Repeating the above procedure without the ion-permeable membrane preventing contact of the sulfuric acid with the ferrosilicon cathode, the cathode potential is only 0.24 volt at a current density of 380 milliamperes/cm.$^2$ Similar results are obtained when a cathode of a tungsten/silicon alloy is substituted for the ferrosilicon cathode.

*Example 13*

A porous cathode is prepared and used as in Example 12 except that the ferrosilicon powder used passes a 270 mesh screen but is held on a 325 mesh screen.

| Current density, milliamperes/cm.$^2$: | Cathode potential (volts) vs. saturated calomel electrode |
|---|---|
| 0 | 0.98 |
| 268 | 0.81 |
| 429 | 0.76 |

Similar results are obtained when a cathode of a chromium/silicon alloy is substituted for the ferrosilicon cathode.

*Example 14*

A porous cathode is prepared and used exactly as in Example 12 except that the ferrosilicon contained 15% silicon and 85% iron and it was held on a 270 mesh screen and passed a 325 mesh screen.

| Current density, milliamperes/cm.$^2$: | Cathode potential (volts) vs. saturated calomel electrode |
|---|---|
| 0 | 0.98 |
| 231 | 0.83 |
| 462 | 0.76 |

*Example 15*

A porous cathode is prepared and used as in Example 12 except that $MoSi_2$ passing a 325 mesh screen is used instead of the ferrosilicon and is sintered in a helium atmosphere for 3 hours at 1075° C. The operating temperature of the fuel cell is 90° C. instead of room temperature. The following results are obtained.

| Current density, milliamperes/cm.$^2$: | Cathode potential (volts) vs. saturated calomel electrode |
|---|---|
| 0 | 1.07 |
| 127 | 0.94 |
| 194 | 0.90 |

Similar results are obtained when a cathode made from a mixture of ferrosilicon and molybdenum disilicide is used instead of the pure ferrosilicon cathode.

*Example 16*

A fuel cell is constructed using platinum catalyzed ferrosilicon electrodes prepared in the following manner. Commercial ferrosilicon (14.7% Si) castings are ground into discs 2" outside diameter x 1/8" thick. The discs are drilled for mounting and attaching electrical leads. The surfaces of the electrodes to be placed adjacent to the electrolyte are sand blasted. The electrodes are platinum catalyzed by the deposition of platinum by displacement of platinum from aqueous $Na_2PtCl_6$. Electrical leads in the form of gold wires are attached to the electrodes with tantalum bolts and the fuel cell is assembled in accordance with FIGURE 1. 70% nitric acid serves as the oxidant and 12.5 volume percent methanol (in 30% sulfuric acid) is used as the fuel. The cell has an open-circuit voltage of 1.0 volt and delivers 31 ma./cm.$^2$ at 0.3 volt for 6 hours without deterioration.

What is claimed is:

1. In a fuel cell composed of two conductive electrodes separated by an acidic electrolyte, a fuel supply, an oxidant supply and means for electrically connecting the electrodes, the improvement wherein at least one electrode is a catalyst-coated metal/silicon combination selected from the group consisting of metal/silicon alloys and metal silicides, the percentage of silicon in said combination being from about 8% to about 75% by weight, the balance being substantially said metal selected from the group consisting of nickel, cobalt, iron, molybdenum, manganese, vanadium, tungsten and chromium.

2. A fuel cell as in claim 1 wherein said electrode is the cathode.

3. A fuel cell as in claim 1 wherein said electrode is the anode.

4. A fuel cell as in claim 1 wherein said electrode is porous.

5. A fuel cell as in claim 1 wherein said electrode has a surface roughness factor of at least about 2.

6. A fuel cell as in claim 1 wherein said metal/silicon combination is an alloy of silicon and iron.

7. A fuel cell as in claim 1 wherein said electrode has a platinum coating.

8. A fuel cell as in claim 1 wherein a cation-permeable membrane is disposed in said electrolyte between said electrodes whereby contact between the oxidant and the fuel is substantially prevented.

9. A fuel cell as in claim 8 wherein said oxidant is nitric acid.

References Cited by the Examiner
UNITED STATES PATENTS

| | | | |
|---|---|---|---|
| 2,665,474 | 1/1954 | Beidler | 75—201 |
| 2,831,242 | 4/1958 | Kieffer | 29—182.5 |
| 3,088,990 | 5/1963 | Rightmire et al. | 136—86 |
| 3,160,528 | 12/1964 | Dengler et al. | 136—86 |
| 3,161,948 | 12/1964 | Bechtold | 29—182.5 |
| 3,174,881 | 3/1965 | McEvoy | 136—86 |

WINSTON A. DOUGLAS, *Primary Examiner.*

H. FEELEY, *Assistant Examiner.*